Patented June 21, 1949

2,473,797

UNITED STATES PATENT OFFICE 2,473,797

TRIAZOLYLENE TRIAZINES AND PREPARATION THEREOF

Donald W. Kaiser, Riverside, Conn., assignor to American Cyanamid Company, New York, N. Y., a corporation of Maine No Drawing. Application November 13, 1944, Serial No. 563,313

12 Claims. (Cl. 260—249.5)

This invention relates to new organic compounds and to a method of preparing them.

I have discovered that 3-amino-1,2,4-triazoles may be caused to react with dicyandiamide to yield a new class of organic compounds. The new compounds and the reaction by which they are prepared may be illustrated by means of the following equation:

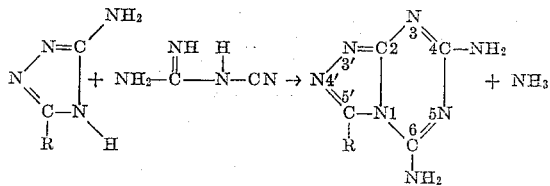

In the equation "R" represents hydrogen or an aliphatic, cycloaliphatic, or aromatic organic radical. These new compounds may be called 1,2 - (5' - substituted-1,3',4')-triazolylene-4,6-diamino-1,3,5-triazines.

The new compounds are generally characterized as being white, crystalline solids, insoluble in cold water and most organic solvents. They are soluble to some extent in hot water and acids but are insoluble in aqueous solutions of alkalis. They melt and/or decompose at relatively high temperatures, some having a tendency to sublime. They are useful as intermediates in the production of resins, as upon reaction with formaldehyde, and as intermediates in the production of dye-stuffs and pharmaceuticals.

The new compounds are prepared by merely mixing together and heating dicyandiamide and a suitable 3-amino-5-(substituted)-1,2,4-triazole or an acid salt thereof. The reaction temperature is preferably above 60° C. but below the decomposition of the triazole or the reaction product, that is not over about 200° C. No solvent is necessary in the reaction but, if desired, the reactants may be dissolved in a small amount of water or an organic liquid or mixtures thereof. Best yields are obtained when the concentration of the reactants is at a maximum.

Dicyandiamide is a well known organic compound and need not be described. The 3-amino-5-substituted-1,2,4-triazoles are, for the most part, known compounds. They may be prepared by methods known to those skilled in the art or by the method described and claimed in my co-pending application Serial No. 536,019, filed May 17, 1944, now Patent No. 2,382,156, issued August 14, 1945. Preparation of representative 3-amino-5-substituted-1,2,4-triazoles is illustrated in the specific examples which follow.

As stated before, the 3-amino-5-substituted-1,2,4-triazole may be any such compound in which the 5 position is substituted with hydrogen or an aliphatic, cycloaliphatic or aromatic radical. Among such may be specifically mentioned 3-amino-1,2,4 - triazole, 3 - amino-5-methyl - 1,2,4-triazole, 3-amino-5-butyl-1,2,4-triazole, 3-amino-5-amyl-1,2,4-triazole, 3-amino - 5 - dodecyl-1,2,4-triazole, 3-amino-5-$\omega$-hydroxy decyl - 1,2,4 - triazole, 3-amino-5-phenyl-1,2,4-triazole, 3-amino-5-p - nitrophenyl - 1,2,4 - triazole, 3 - amino-5-o-carboxyphenyl-1,2,4 - triazole, 3 - amino-5-p-hydroxyphenyl-1,2,4 - triazole, 3 - amino - 5 - naphthenyl-1,2,-4-triazole, 3-amino-5-nicotinyl-1,2,4-triazole, and other known 5-substituted aliphatic, cycloaliphatic and aromatic 3-amino-1,2,4-triazoles. The acid salts of these compounds may also be used as intermediates, but it will be understood, of course, that it is the free triazole that is the essential reactant with dicyandiamide in my new process.

Since ammonia is evolved as a result of the reaction, it may be advantageous in some instances as when the free triazole is used to add an equivalent amount of acid to the reaction mixture to combine with the ammonia. Of course, when using the acid salt of the triazole, sufficient acid is present in the reaction mixture to react with the ammonia formed therein.

My invention will now be illustrated in greater detail by means of the following specific examples in which representative 3-amino-5-substituted-1,2,4-triazoles are prepared and reacted with dicyandiamide to yield the new compounds of the present invention. It will be understood, of course, that these examples are given for purposes of illustration and are not to be considered as limiting my invention to the particular details or reactants described therein.

Example 1

63.5 g. of 95% sodium hydroxide dissolved in 125 cc. of water was placed in a three-necked flask provided with a stirrer, dropping funnel, and thermometer. 63 g. of pulverized dicyandiamide was added to the sodium hydroxide solution with stirring until dissolved. 150 cc. of acetone was then added. The resulting double layer was agitated thoroughly and the temperature kept between 20–25° C. while 70.25 g. of benzoyl chloride was added in the course of ½ hour. During this time a solid separated but addition of water after the reaction was complete gave a clear, very light yellow solution. Acidification of the solution with acetic acid precipitated benzoyl dicyandiamide which was filtered, washed well with water and allowed to air dry.

To a solution of 16.5 g. (0.40 mole) of 97% sodium hydroxide in 100 cc. of water was added 42 g. (0.40 mole) of hydrazine dihydrochloride. This solution was then added to a suspension of 37.6 g. (0.20 mole) of benzoyl dicyandiamide in 250 cc. of methanol and the whole refluxed. Within 5 minutes of reflux, a solid cake of product had formed. Water was added, the mixture cooled, and the solid filtered, washed well with water, and air dried. A quantitative yield (41 g.) of 3-ureido-5-phenyl-1,2,4-triazole decomposing at 233–235° C. was obtained.

A solution of 40.6 g. (0.20 mol) of 3-ureido-5-phenyl-1,2,4-triazole and 33 g. (0.5 mol) of 85% potassium hydroxide in 250 cc. of water was refluxed for three hours, during which time ammonia was strongly evolved. The solution was treated with filter aid and activated charcoal, filtered, and cooled. Excess nitric acid was slowly added, causing evolution of carbon dioxide and precipitation of 3-amino-5-phenyl-1,2,4-triazole nitrate. After filtration the insoluble nitrate salt was slurried in water with an excess of sodium bicarbonate to obtain the insoluble free base.

After mixing 24.0 grams (0.15 mol) of 3-amino-5-phenyl-1,2,4-triazole, 15.0 grams (0.15 mol) of concentrated hydrochloric acid, and 75 cc. of water, 16.8 grams (0.20 mol) of dicyandiamide was added and the whole heated to a reflux. Within a short time solid began to separate from the hot solution. Refluxing was continued for three hours, the mixture allowed to cool, the colorless solid filtered, and washed well with water. The product, 1,2-(5'-phenyl-1,3',4')-triazolylene-4,6-diamino-1,3,5-triazine decomposed sharply at 380° C. When heated at temperatures below this it sublimed slightly. The product was alkali insoluble, but slightly soluble in hot dilute hydrochloric acid. Addition of ammonia to the acid solution reprecipitated the free base. Recrystallization of the product from a solution of 650 cc. of glacial acetic acid, 50 cc. of water and 300 cc. of dioxane resulted in the separation of a quantity of fluffy needles which were found to decompose as before at 380° C.

*Example 2*

A mixture of 16.0 g. (0.10 mol) of 3-amino-5-phenyl-1,2,4-triazole and 8.4 g. (0.10 mol) of dicyandiamide was pulverized in a motar, placed in a large test tube, and heated in an oil bath. An internal temperature of 150–160° was maintained for 2½ hours, although the mixture had become pasty at 135°. During this time ammonia was evolved and the opaque liquid became more viscous. After cooling, the solid was digested with boiling water, the insolubles filtered, washed with boiling water and then acetone. The colorless solid decomposed at 380° and fusion with the previously prepared sample of Example 1, gave no depression of the decomposition point. The product, 1,2,-(5-phenyl-1,3',4')-triazolylene-4,6-diamino-1,3,5-triazine weighed 12.3 g.

*Example 3*

An intimately ground mixture of 39.3 g. (0.20 mol) of 3-amino-5-phenyl-1,2,4-triazole hydrochloride and 16.0 g. (0.20 mol) of dicyandiamide was placed in a large test tube and heated to an internal temperature of 160–170° in an oil bath. The solid became pasty but never liquid and after 2½ hours the mixture became almost solid. After digesting the material with hot water, the colorless solid was filtered, washed with boiling water, then acetone, and allowed to dry. Decomposition of the product occurred at 380° and fusion with a previously prepared sample gave no depression. The weight of colorless, amorphous solid was 27 g., which represented 64% of the theoretical. In a later experiment, using 0.60 mol of reactants, the yield of 1,2,-(5'phenyl-1,3',4')-triazolylene-4,6-diamino-1,3,5-triazine was 77%.

*Example 4*

To a solution of 42.2 g. of 95% sodium hydroxide in 100 cc. of water was added 50.4 g. of dicyandiamide and 250 cc. of acetone. The mixture was stirred and 51 g. of acetic anhydride was added at such a rate that the temperature was maintained at 5–10° C. After addition of the acetic anhydride, water was added and the clear solution acidified with acetic acid whereupon colorless crystals of acetyl dicyandiamide were obtained. The product was washed well with water and allowed to dry.

To a suspension of 104 g. (0.80 mol) of hydrazine sulfate in 400 cc. of water was added 34 g. (0.80 mol) of 95% sodium hydroxide. As soon as solution resulted, 101 g. (0.80 mol) of acetyl dicyandiamide was added and the mixture refluxed. Some gas was evolved, and after heating a half hour the mixture was cooled, the solid filtered, and washed with water. The dried solid, 3-ureido-5-methyl-1,2,4-triazole, weighed 68 g.

To a solution of 127.5 g. (3.0 mols) of 95% sodium hydroxide in 300 cc. of water was added 202 g. (1.43 mols) of 3-ureido-5-methyl-1,2,4-triazole. The resulting solution was refluxed for three hours, during which time ammonia was strongly evolved. Decolorizing charcoal was added, and the solution filtered, neutralized with acetic acid and evaporated to dryness. The solid was extracted with boiling ethyl acetate and filtered from the sodium acetate. Evaporation of the ethyl acetate solution gave 3-amino-5-methyl-1,2,4-triazole.

A mixture consisting of 52 g. (0.53 mol) of crude 3-amino-5-methyl-1,2,4-triazole, 50.4 g. (0.60 mol) of dicyandiamide, 53 g. (0.53 mol) of concentrated hydrochloric acid and 200 cc. of water was heated to reflux. Norite was added, the solution filtered, and refluxing of the clear, colorless filtrate continued. After almost an hour, finely divided solid began to separate. Heating was continued one-half hour longer. The solid was filtered, washed with water, and the filtrate again refluxed. After heating four hours longer, additional product had not separated so the filtrate was discarded. The product, after drying, decomposed at 345–346°. Crystallization from about 2 liters of boiling water gave fine, colorless needles of 1,2-(5'-methyl-1,3',4')-triazolylene-4,6-diamino-1,3,5-triazine, which decomposed as before at 345–346°.

*Example 5*

A solution of 84.4 g. of 95% sodium hydroxide in 300 cc. of water was prepared and divided into two equal portions. One part was placed in a three necked flask equipped with a stirrer, thermometer and two dropping funnels. 126 g. of dicyandiamide and 300 cc. of acetone were added to the caustic soda solution in the flask. The mixture in the flask was stirred and maintained at 20° C. while the second portion of the alkali solution was added simultaneously with 134.5 g. of caproyl chloride. After the addition was completed the reaction mixture was diluted with water and acidified with acetic acid whereby a colorless solid was precipitated. The material caproyl dicyandiamide, was filtered, and washed well with water.

After dissolving 25.50 g. (0.60 mole) of 95% sodium hydroxide in 300 cc. of water, 78 g. (0.60 mole) of hydrazine sulfate was added and then 91 g. (0.50 mole) of caproyl dicyandiamide. The mixture was stirred and heated, but as the caproyl dicyandiamide did not wet well, 200 cc. of Cellosolve was added. As the mixture was still quite bulky, an additional 250 cc. of water and 150 cc. of Cellosolve were added. When reflux occurred, almost complete solution resulted, followed immediately by the formation of a rather granular precipitate. Heating was continued 5 minutes longer, the mixture cooled with ice, and the solid filtered. The colorless solid, 3-ureido-5-n-amyl-1,2,4-triazole, weighed 91 g.

To a solution of 32 g. (0.75 mol) of 95% sodium hydroxide in 250 cc. of water was added 69 g. (0.35 mol) of 3-ureido-5-n-amyl-1,2,4-triazole. The resulting pale yellow solution was refluxed for seven hours. During this time the solution became colorless, and ammonia was evolved. Norite was added, the solution filtered, and the colorless filtrate cooled and acidified with excess nitric acid. Carbon dioxide was strongly evolved, and colorless crystals of 3-amino-5-n-amyl-1,2,4-triazole nitrate separated.

A clear solution resulted after heating to reflux a mixture of 29.0 g. (1.133 mol) of 3-amino-5-n-amyl-1,2,4-triazole nitrate, 16.8 g.(0.20 mol) of dicyandiamide, and 50 cc. of water. The mixture was refluxed for a total of four hours solid having appeared the first one-half hour. Filtration, after cooling, gave fluffy, colorless plates which decomposed at 315–316°. Recrystallization from 500 cc. of boiling Cellosolve gave fine plates which decomposed as before at 315–316° when immersed in a hot bath. On gradual heating decomposition occurred at a lower temperature. Chemical analysis of the product proved it to be 1,2-(5'-n-amyl - 1,3',4') -triazolylene-4,6-diamino-1,3,5-triazine.

*Example 6*

To a suspension of 73 g. (0.227 mol) of 3-amino-5-hepta decyl-1,2,4-triazole in 300 cc. of methanol was added 22.7 g. (0.227 mol) of concentrated hydrochloric acid, and 33.6 g. (0.40 mol) of dicyandiamide. A slightly turbit solution resulted after heating to reflux; filter aid was added, the solution filtered, and the clear filtrate again refluxed. After about an hour crystalline solid began to separate. The mixture was refluxed three hours longer, the solid filtered from the hot solution, washed with methanol and air dried. An additional four hours of heating failed to precipitate any further quantity of product from the filtrate. After dissolving the compound in about a liter of solvent which consisted of about 30% ethanol and 70% Cellosolve colorless plates were obtained which decomposed at 219–220°.

I claim:

1. A method of preparing compounds having the general formula

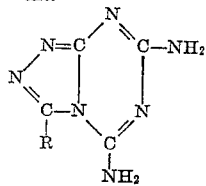

in which R is a member of a group consisting of aliphatic and aromatic radicals which comprises mixing together and heating dicyandiamide and a compound having the general formula

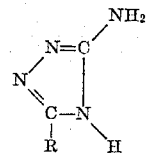

in which R is as defined above and thereafter recovering the thus formed 5' substituted triazolylene triazine having the general formula above.

2. A method of preparing compounds having the general formula

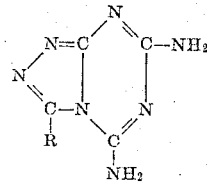

in which R is an aromatic radical of the benzene series which comprises mixing together and heating dicyandiamide and a compound having the general formula

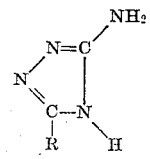

in which R is as defined above and after reaction thereof recovering the thus formed 5' aromatic substituted triazolylene triazine having the general formula above.

3. A method of preparing compounds having the general formula

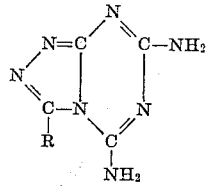

in which R is an aliphatic radical which comprises mixing together and heating dicyandiamide and a compound having the general formula

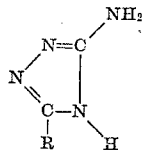

in which R is as defined above and after reaction thereof recovering the thus formed 5' aliphatic substituted triazolylene triazine having the general formula above.

4. A method of preparing 1,2-(5'-phenyl-1,3',4')-triazolylene-4,6-diamino - 1,3,5 - triazine having the formula

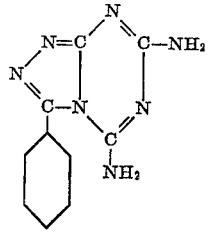

which comprises mixing together and heating dicyandiamide with 3-amino-5-phenyl-1,2,4-triazole and after reaction thereof recovering the thus formed 1,2-(5'-phenyl-1,3',4')-triazolylene-4,6-diamino-1,3,5-triazine.

5. A method of preparing 1,2-(5'-methyl-1,3',4')-triazolylene-4,6-diamino-1,3,5-triazine having the formula

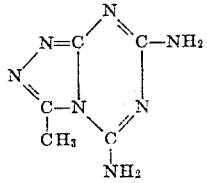

which comprises mixing together and heating dicyandiamide with 2-amino-5-methyl-1,2,4-triazole and after reaction thereof recovering the thus formed 1,2-(5'-methyl-1,3',4')-triazolylene-4,6-diamino-1,3,5-triazine.

6. A method of preparing 1,2-(5'-n-amyl-1,3',4'-)triazolylene-4,6-diamino-1,3,5-triazine having the formula

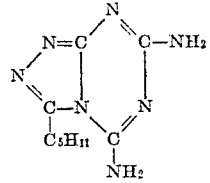

which comprises mixing together and heating dicyandiamide with 3-amino-5-n-amyl-1,2,4-triazole and after reaction thereof recovering the thus formed 1,2-(5'-n-amyl-1,3',4'-)triazolylene-4,6-diamino-1,3,5-triazine.

7. Compounds having the following formula

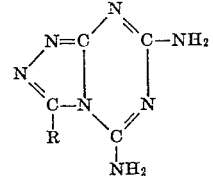

in which R is a radical of the group consisting of aliphatic and aromatic radicals.

8. Compounds having the following general formula

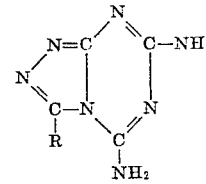

in which R is an aromatic radical of the benzene series.

9. Compounds having the following general formula

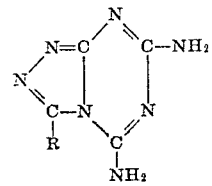

in which R is an aliphatic radical.

10. 1,2-(5'-phenyl-1,3',4')-triazolylene-4,6-diamino-1,3,5-triazine having the formula

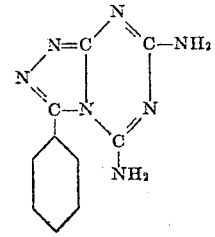

11. 1,2-(5'-methyl-1,3',4')-triazolylene-4,6-diamino-1,3,5-triazine having the formula

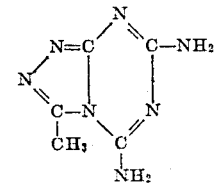

12. 1,2-(5'-n-amyl-1,3',4')-triazolylene-4,6-diamino-1,3,5-triazine having the formula

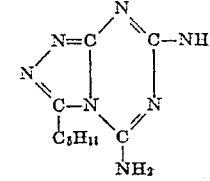

DONALD W. KAISER.

REFERENCES CITED

The following references are of record in the file of this patent:

UNITED STATES PATENTS

| Number | Name | Date |
| --- | --- | --- |
| 2,295,567 | D'Alelio | Sept. 15, 1942 |
| 2,320,816 | D'Alelio | June 1, 1943 |
| 2,320,820 | D'Alelio | June 1, 1943 |

OTHER REFERENCES

Chem. Abstracts, vol. 7, pages 478–479.